(No Model.)
W. JENS.
ELECTRIC RAIL BOND.
No. 575,354. Patented Jan. 19, 1897.
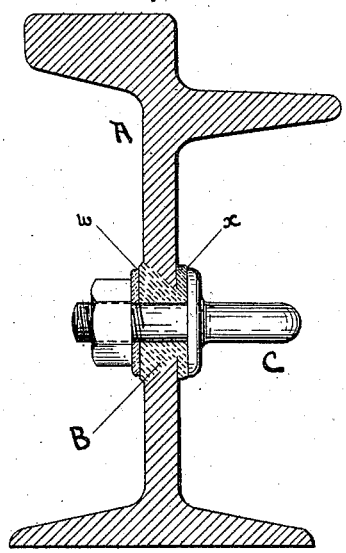
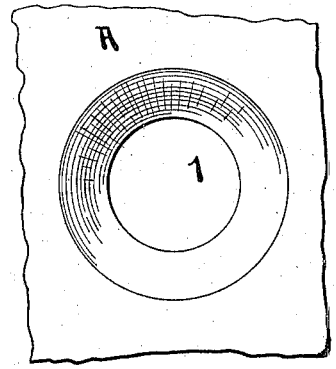
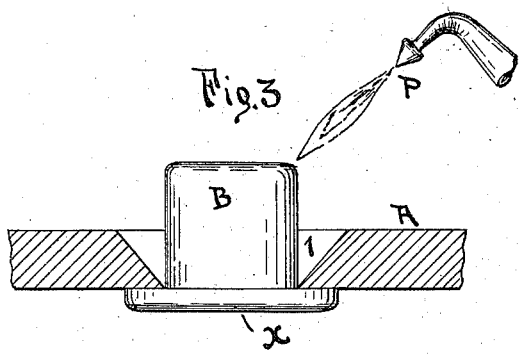
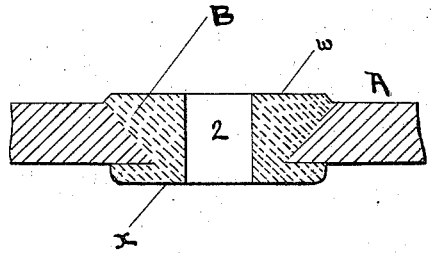
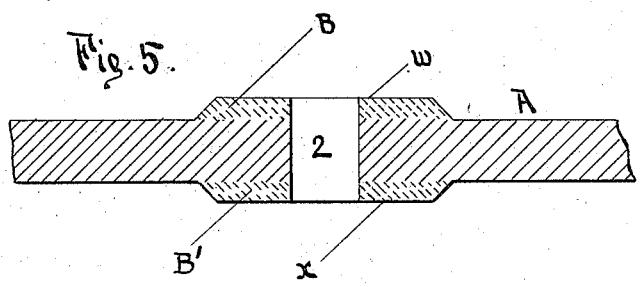
WITNESSES:
INVENTOR
William Jens
BY
Bruce Ford
ATTORNEY.

UNITED STATES PATENT OFFICE.

WILLIAM JENS, OF JOHNSTOWN, PENNSYLVANIA, ASSIGNOR OF TWO-THIRDS TO T. C. DU PONT AND BRUCE FORD, OF SAME PLACE.

ELECTRIC RAIL-BOND.

SPECIFICATION forming part of Letters Patent No. 575,354, dated January 19, 1897.

Application filed June 30, 1896. Serial No. 597,524. (No model.)

*To all whom it may concern:*

Be it known that I, WILLIAM JENS, of Johnstown, in the county of Cambria and State of Pennsylvania, have invented a new and useful Improvement in Electric Rail-Bonds, of which the following is a specification.

My invention has reference to electric rail-bonds whose object is to provide a path of good electrical conductivity between two rails across a joint or other intervening space of poor electrical conductivity.

My invention consists of an improved method of making the contact between bond and rail, and is fully described in the following specification and shown in the accompanying drawings, which form a part thereof.

The object of my invention is to provide a construction by which the connection between bond and rail shall have as low a resistance as possible, and shall be impervious to moisture or other matter which might form an electrolytic action between the dissimilar metals of bond and rail, and yet be such that the bonds can readily and quickly be attached to the rails after the rails have been laid in the ground.

In carrying out my invention I weld to a convenient part of each rail a plate or button, of copper, (or the same metal as the bond-bars,) and make the contact of the bond-bars with the rail at this point. In practice I prefer to weld these contact-pieces on in the shop where the rails are made, although it may be done at any other place, as found most convenient. The contact between this plug, plate, or button and the bond-bar is thus between similar metals, and electrolysis is thereby eliminated at this joint. The connection between the contact-button and rail being a weld is an integral union between the two metals. By the term "weld" I mean to include such operations as are usually termed "integral unions," such, for instance, as brazing.

Referring to the drawings, Figure 1 shows a section of a rail with my improvement applied thereto. Figs. 2, 3, and 4 show steps in the operation of uniting the buttons. Fig. 5 shows a construction in which contact-faces of copper are welded to the rail in place of the button shown in the other figures.

A is the rail; B, the contact-piece, of copper, welded to the rail and drilled and faced to give contact to the copper bond-bar C. The bond-bar C is attached to the plug by any of the well-known bond-fastenings, such as expanding, riveting, soldering, or bolting. Contact is made along the inside of the hole 2 and upon the faces W and X.

In welding the buttons to the rails I prefer to use the method shown in Figs. 2, 3, and 4, but do not confine myself to any one method, as the same result could be accomplished by any of the well-known methods of welding or brazing copper to steel.

In the construction shown I drill the countersunk hole 1 in the web, top, or bottom flange of the rail A, as shown in plan by Fig. 2. Then, as shown in Fig. 3, I insert the button B, and by means of the source of heat P melt down the projecting portion of B into integral union with the rail A, filling the countersunk portion 1 and forming the face W. (Shown in Fig. 4.) I then drill the hole 2, face off the contact-faces W and X, and am then ready to connect the bond, as shown in Fig. 1. In the construction shown in Fig. 5 I merely weld or melt into union with the steel enough copper B B' to give me the contact-faces W and X.

The source of heat P (shown in Fig. 3) is either a blowpipe-flame or an electric arc.

I do not limit myself to any particular shape for the contact-piece, and I name copper as the material of which I make the contact-piece B only because that is the metal usually employed for bonds. I do not limit myself to this metal, since any metal of similar nature to the metal employed for the bond would give the same result, that is to say, joints only between metals of similar nature and integral unions between dissimilar metals.

Having now described my invention, what I claim as new, and desire to secure by Letters Patent, is—

1. In a rail-bond, a portion of metal similar in nature to the metal of the bond-bar, integrally united to the rail and adapted to have the bond-bar attached thereto.

2. In a rail-bond, a portion of metal similar in nature to the metal of the bond-bar integrally united to the rail and having a surface to which to attach the bond.

3. In a rail-bond, a button or plug of metal similar in nature to the metal of the bond-bar inserted in a hole in the rail and integrally united thereto and having means for making electrical contact with the bond.

4. In a rail-bond, a button or plug, B, of metal similar in nature to the metal of the bond-bar inserted in a hole, 1, in the rail, A, and integrally united thereto, and having a hole, 2, in which to fasten the bond, C, into contact.

5. The combination of a rail having integrally united thereto a contact-piece of metal similar in nature to the metal of the bond-bar, and a bond-bar attached to said contact-piece.

6. The method of bonding rails by integrally uniting to each rail one or more contact-pieces of a metal similar in nature to the metal of the bond-bar, and connecting the bond-bars to said contact-pieces, substantially as set forth.

In testimony whereof I have affixed my signature in presence of two witnesses.

WILLIAM JENS.

Witnesses:
JOHN H. KENNEDY,
W. F. GONDER.